Patented May 31, 1927.

1,630,771

UNITED STATES PATENT OFFICE.

EUGEN THOMA, OF PFORZHEIM, GERMANY.

PROCESS OF SOLDERING ARTICLES.

No Drawing. Application filed July 17, 1924, Serial No. 726,637, and in Germany September 7, 1922.

This invention relates primarily to the art of soldering the ends of rings and links and is particularly useful in connection with making link mesh fabrics and wire chains. In its more extended application it will be found useful in connection with the manufacture of many articles, in connection with which it is necessary to solder surfaces together. In order to fully set forth the advantages, and to give an example of how this invention may be practiced, the invention is explained in connection with the manufacture of wire mesh fabric such as is usually used in the manufacture of ladies' hand bags. It is to be understood that this explanation is given merely by way of example inasmuch as it will appear that the invention is also applicable to the manufacture of watch chains, pull chains for electric light switches bracelets and many other articles.

The standard method of making mesh fabrics as it has been practiced in this industry for upwards of fifteen years, consisted in first making a special type of wire (called solder filled wire) from which the rings or links of the mesh fabric were formed. This special solder filled wire is made from a tube of the desired metal filled with a core of soldering material. The tube with its core of soldering material is, by the use of dies and by drawing, reduced to wire of the desired diameter. The wire, after it is formed as described, is fed to a mesh machine which cuts from the wire a blank of the desired length, links the blank with previously formed rings and then closes the blank to ring formation. These steps are repeated until a piece of fabric of the desired size is produced. This fabric is then exposed to heat. which softens the core of solder and causes it to join the ring ends together. The fabric after the ring ends have been soldered together is then utilized in making purses and mesh bags. It has been recognized for many years that the so-called solder filled mesh has many disadvantages, particularly in that the shell of the metal readily breaks or wears through.

Lately there has come into use in this industry a process of utilizing solid wire in place of the solder filled wire. This process consists in inserting a small thin piece of soldering material, during the formation of the rings on the mesh machine, between the oppositely positioned ends of each ring and after a piece of mesh has been made, melting the solder to unite the ring ends together. This process has gone into commercial use but requires for the practical operation thereof special devices for feeding the solder in conjunction with the operation of the mesh machine and further requires a specially made solder ribbon and the exercise of care in securing the small piece of solder between the ring ends, so that it will be in place when the mesh is exposed to the heating operation.

The present invention is primarily intended for use in connection with solid wire in contradistinction to solder filled wire and avoids the insertion of the small piece of solder between the ring ends as above described. In carrying out this invention a suitable solid wire made of any particular metal or alloy of metals is formed, on a suitable machine, into a mesh fabric or chain or in any other desired form. One of the types of mesh machines which may be utilized in forming the wire into a mesh fabric is shown in the United States patent to Smith & Smith No. 1,078,317 dated November 11, 1913. Mesh fabric is well illustrated in Fig. 20 of said Smith & Smith patent, excepting that in so far as the Smith & Smith patent indicates the wire as being solder filled wire, the wire used in carrying out this invention is solid wire. During the formation of the mesh fabric on the said machines the ends of each ring or link are pressed firmly together so that certain portions of the opposite ends of each ring or link are in contact, but nevertheless leaving an open space or spaces between the opposite faces of each ring or link.

The most concrete description of this invention can be made in connection with mesh fabrics and therefore the details of the invention are set forth by describing the operations in connection with soldering such fabric.

The mesh fabric after it has been formed on a machine (for instance of the Smith & Smith type) with the rings in interlinked relation and with the two ends of each ring pressed closely together, unsoldered and without any soldering material therebetween, are in a suitable condition to be treated according to this process. Such fabrics are first cleansed to remove all foreign substances and then hung in an electrolyte containing material capable of use as a soldering agent, which soldering material should have a melting point lower than the melting point of the metal constituting the links of the fabric. By electrolytic action solder is deposited upon the rings, or links, particularly upon such portions of the ring or link ends as are not in close physical contact. During the deposit of the soldering material at the ring joints the soldering material is also deposited upon the other or main surfaces of the rings or links. The deposit on the main surfaces of the rings or links is treated in a special manner as hereinafter explained. After a sufficient amount of soldering material has been deposited the fabric or chain is removed from the electrolyte, washed, treated with a fluxing agent, covered with graphite, Paris rouge or other material, which will keep the soldering material from flowing from ring to ring or link to link, and then heated in a gas or electric furnace whereby the solder is melted. The close proximity of the two ends of each ring form a capillary space and when the solder is melted, the solder in proximity to this capillary space, is drawn or flows into the space and completely fills it. In fact the solder also entirely covers the extreme outer edge of the ring ends at which the joint is formed and joins the two ends together across the outer surfaces thereof, completely covering the joint and making it exceedingly difficult to find the places on the rings where the joints have been made. The time of exposure to the heating operation is very short and the temperature quite high as hereinafter explained. The metals contained in the deposited solder are, by the action of the heat, alloyed. The high temperature, not only solders the ends together to form a soldering joint but in addition thereto the metals of the solder and of the ring are fused together. After the soldering operation is completed the fabric is removed from the furnace and allowed to cool to permit the solder to set. The fabric is then washed again and made into a suitable article, such as a purse and mesh bag.

The present invention may be used with various metal such as brass (and other copper alloys) German silver, silver and gold, but the soldering material must be varied according to the particular metal to be treated.

The foregoing description broadly sets forth the steps of this invention and for the purpose of more specifically and exactly illustrating this invention the following specific examples are given in connection with treating different metals.

As an example for making mesh fabrics from brass wire, (consisting approximately of 80 parts copper and 20 parts zinc) of any suitable gage, say for instance .11 gage, the wire is first formed on a suitable machine into a mesh fabric. This fabric is then treated in the following manner:

1. Thoroughly cleansed, for the purpose of removing all foreign substances, and for the purpose of effecting proper cleansing it is suggested that the material be dipped into a solution of nitric and sulphuric acid in equal parts. This dipping step must be carefully carried out inasmuch as the fumes from the acids are highly objectionable.

2. The material is then thoroughly washed in water to remove all traces of the cleansing acids.

3. The material after washing is dipped into water containing in solution a small amount of potassium cyanide.

4. After the cyanide bath the material is thoroughly washed in hot water.

These four steps complete the cleansing of the material.

5. After the material is thoroughly cleansed it is hung on a suitable rack and suspended in an electrolyte. Care should be exercised in hanging the material in the electrolyte so that all portions thereof, which are to receive a deposit of the soldering material thereon are submerged and that the material hangs as smoothly as possible.

A suitable electrolyte must be prepared which shall contain therein the necessary metals to form a soldering material capable of properly soldering the ring ends together. In preparing such soldering material the ordinary plating preparations have been found highly satisfactory. It is preferred to use the metallic salts known as Trisalyt salts which are particularly suitable for this purpose. These Trisalyt salts are particularly advantageous in a combined bath, by reason of the fact that they are specially prepared and contain suitable conducting and reducing salts for use in an electrolyte and can be deposited simultaneously by the action of the electric current. A suitable electrolyte to be used with brass wire may consist of plating salts (Trisalyt salts $Ag_2(CN)_2 \cdot 2\ KCN \cdot K_2SO_4$) of the following metals in the following proportions by weight:

|  | Per cent |
|---|---|
| Silver | 50 |
| Brass | 35 |
| Cadmium | 10 |
| Copper | 5 |

To one and one-half ounces of these metal salts is added one liter of distilled water and enough of the electrolyte is prepared to submerge the fabric in its suspended condition. When depositing on brass wire a silver anode is used in the depositing apparatus and the fabric is hung about five inches from the anode. The electric current utilized may vary from one to one and one-half volts (at ten to twelve amperes). The mesh is allowed to remain in the electrolyte until a sufficient amount of the soldering material has been deposited thereon to insure proper soldering in the subsequent heating operation. It has been found that the length of time of treatment in the electrolyte may vary from ten to forty minutes depending upon the amount of solder to be deposited. It is also advisable to stir the electrolyte during the depositing operation in order to keep the électrolyte in uniform condition throughout.

6. The fabric, after the soldering material has been deposited thereon, is removed from the electrolyte and washed in water.

7. After the washing operation (of step 6) is completed the material is boiled in a solution of water and borax. This boiling operation may be carried out by putting the fabric in the borax solution, bringing the solution to the boiling point and when the solution has reached the boiling point removing the material from the solution.

8. The next step is to dip the fabric into a solution of rosin and alcohol. This treatment is not essential but is advisable in that it has the effect of hastening the melting of the solder when it is heated.

9. The next step is to cover the material with powdered Paris rouge, graphite or other suitable material which serves the purpose of keeping the soldering material, when it is melted, from flowing from ring to ring or link to link.

10. The material is then laid flat on a metal or asbestos plate and subjected to heat in a suitable furnace. It has been found advisable to subject the aforementioned brass alloy wire to a heat of about 860° C. for about thirty seconds. The heating operation causes the solder to melt and brings about the capillary action heretofore mentioned. The metal of the rings is also highly heated and brings about a fusion between the metal of the wire and the soldering material.

11. After the heating operation is completed the material, while resting undisturbed on the plate, is removed from the furnace and allowed to cool without disturbing it until the glow is off the wire. It is quite important not to disturb the fabric on the plate, after it is removed from the furnace, until after it has cooled sufficiently to allow the solder to start setting. Should the material be agitated on the plate while still glowing many of the rings are apt to be opened.

The metal or asbestos plate referred to have been found satisfactory as a suitable way of introducing the fabric to a furnace and to keep the links thereof in an undisturbed condition, but any other method of retaining the links of the fabric in an undisturbed condition during the heating and cooling operation will be found sufficient as long as the fabric is not stretched or unduly agitated.

12. The fabric is then cleansed by washing it in a dilute solution of sulphuric acid.

13. After the cleansing step (12) the material is washed in soap and water; washed in water and dried.

The foregoing example of operating this process pertains particularly to brass wire but the same steps may be utilized in connection with other wires consisting of copper alloys and also with German silver.

It will be noted from the foregoing description that, after the brass wire (or other copper alloys), has been subjected to the heating operation, not only are the links joined together by the solder but the entire outer surface of the base metal has the soldering material fused thereon. Inasmuch as the fused soldering material is more precious than the metal of the wire alloy, the value of the fabric has been considerably enhanced. Such fabrics having a base core and a more precious covering may be sold in that condition or if it is desirous of finishing them to make the wire still more attractive an additional plating of silver may be deposited over the fused soldering material and the article sold in this condition. If it is desirous of removing the fused solder, in order to expose the base wire, this may be done by submerging the fabric in a bath, using the fabric as an anode and then passing a current through the bath whereby the fused coating on the base wire will be removed and the surface of the base wire exposed. Care should be taken not to permit the wire to remain in the bath too long, otherwise the solder which is between the ring ends will be removed.

It has also been found that instead of introducing all of the materials constituting the solder in a single bath they may be deposited in separate and successive baths. In such instances where it is desirous of using separate baths, a separate electrolyte is prepared each separate electrolyte containing a particular salt, all of which are to constitute the final soldering alloy. In utilizing separate baths it is necessary to be certain that in transferring the fabric from bath to bath none of the solution from one bath is carried into the next.

The steps utilized for treating silver are as follows:

1. The material or fabric to be treated must first be subjected to very thorough cleansing in order to remove dirt, rust, oxides, etc. The cleansing steps recommended are as follows:

(a) The first step in the cleansing operation is to subject the material to boiling water for about five minutes. This treatment results in the removal of substantially all the adhering dirt upon the surface and joints of the material;

(b) The material is then subjected to a further cleansing treatment by dipping it momentarily (2 seconds) into a warm weak diluted solution of sulfuric acid. This solution may consist of about 50 cc. of ordinary commercial sulfuric acid to one liter of water. The sulfuric acid treatment removes oxides, rust, etc. Thereafter the material is again thoroughly washed in boiling water to remove all traces of sulfuric acid;

(c) If the fabric shows fatty spots it should then be immersed in a warm solution of caustic potash for about two or three minutes. To remove the caustic potash the fabric is washed in cold water.

(d) A further precaution, which it is advisable to take in order to insure cleanliness of the material is to treat it with a warm solution of potassium cyanide. This solution may consist of about 25 grams of potassium cyanide to one liter of water and the fabric immersed therein for about one-half to one minute. This step may not always be necessary but it is advisable to utilize it. After the potassium cyanide treatment the fabric is again washed in water.

2. The material is then dipped in a bath containing 12 gr. of mercurial potassium cyanide and one gr. of potassium cyanide to one liter of water. After this treatment the material is again carefully washed in running water.

3. In working with silver materials which are to constitute the final solder, it is preferable to deposit the solder upon the material in separate baths. These separate baths, each containing an element of the soldering material are prepared as follows:

(a) The first electrolyte consists of a bath containing in proportion 40 gr. of zinc potassium cyanide and 2 gr. of potassium cyanide dissolved in one liter of water. The bath is used at ordinary room temperature and the voltage from 1.4 to 1.5 volts. Zinc anodes may be used either cast or drawn. The material to be soldered is hung in the electrolyte and subjected to treatment for about five minutes. After the material is removed from this bath it must be cleansed in order to remove all adhering solution of the electrolyte.

(b) The second bath is prepared as follows:

To one liter of water, 50 gr. of silver plating salts (in this instance Pantasol salts $KAg(CN)_2$ are recommended). 50 liters are prepared (such 50 liters should contain about 2½ kg. of such salts or about 1 kg. of pure silver. If the Trisalyt form of salts are used, a greater proportion to make up 1 kg. of pure silver must be used); to one liter of water 80 to 85 gr. of brass plating salts (Pantasol salts) are used; 35 liters thereof are prepared. (The Pantasol salts for brass plating consist of a copper salt and zinc salt, about 60% copper and 40% zinc. If other salts than the Pantasol salts are used these proportions should be maintained). To one liter of water 50 gr. of cadmium potassium cyanide; 15 liters are prepared.

The three preparations mentioned in this paragraph (2) consist in all of 100 liters and these 100 liters are added together and used as a single bath. The material after completion of step (a) is then subjected for twenty minutes to treatment in this combined bath. The bath is used cold and the voltage from 1 to 1.2 volts. Should the material show imperfect coating, when removed from this bath, it may be again subjected to treatment in bath (a) for two to three minutes, removed from that bath and subjected to the combined bath (b) for about ten minutes. It is to be understood, when removing the fabric from bath to bath, that all traces of the bath from which it is taken must be removed before submersion in the subsequent bath.

(c) After treatment according to subdivisions (a) and (b) the material to be soldered is given a third and final deposit of a soldering element. This final bath consists in proportion of 45 gr. of copper plating salts (Pantasol) $KCu(CN)_2$ and a half gr. of zinc plating salts (Pantasol) $KZn(CN)_2$. After the treatment of subdivision (b) it is then hung in this bath and is treated for about eight minutes. The voltage should be at about 1.5 volts but may run somewhat higher up to 2.5 volts provided that at the higher voltage the amperage is not too greatly increased. The higher voltage may result in too rapid a precipitation of the materials in the electrolyte and if this should be the case the voltage must be reduced to 1.5 volts.

The electrolyte in this step is heated to a temperature of from about 55 to 60° C. and for this purpose it is necessary to use an enamel iron container which will withstand heat. The container may be heated by gas flames and the enamel iron container is preferably surrounded at its sides and bottom by an iron jacket. It is preferred to place the container in the iron jacket, and in the bottom of which jacket the gas burners are situated.

4. The material after the solder has been deposited thereon is removed from the electrolyte and is washed in water, dried and then treated as set forth in steps 7 and 8 above.

5. After the washing operation the material is covered with graphite or other suitable material which serves the purpose of keeping the solder, when it is melted, from flowing from the material.

6. The material is then laid flat on a metal or asbestos plate and subjected to heat in a suitable furnace. The melting point of the solder ranges between 830 and 835° C.

7. After the heating operation is completed the material is allowed to cool without unduly disturbing it.

8. The graphite or other substitute is then knocked from the material. The material is then cleansed by washing it in a hot diluted solution of sulfuric acid. This solution may consist of 50 cc. of commercial sulfuric acid to 1 liter of water. The material is then washed with soap and water; washed in water and dried.

9. If the material should not be perfectly smooth it may be treated in either of the following manners:

(a) It may be put into a bath corresponding to that mentioned in sub-division 3 hereof and using the material as an anode, with a current of 1 volt the material may be rendered perfectly smooth. It has been found that this treatment should be extended over a period of 20 minutes to one-half hour but care must be exercised so that the soldering material in the joint is not removed, or (b) The material in its rough condition may be treated with powdered pumice stone in a shaking barrel which results in smoothing it and at the same time polishes the material.

The anodes to be used in connection with the three electrolytes mentioned in division 2 hereof are preferably made according to the proportions—27 cm. long, 11 cm. wide and 1½ to 2 mm. thick.

The steps utilized for treating gold are as follows:

(1) The material or fabric to be treated must first be subjected to thorough cleansing to remove all foreign substances and this may be done as set forth in paragraph 1 in connection with the treatment of silver.

(2) In working with gold materials it is preferred to deposit the soldering materials by means of a two bath operation.

(a) The first bath may be prepared by dissolving 2 gr. of chloride of gold in 1 liter of water and dissolving in 1 liter of water 50 gr. of copper potassium cyanide (containing 20 gr. of copper). 5 parts of the gold solution and 1 part of the copper solution are then mixed. To this last mentioned mixture is added ½ gr. of potassium cyanide and 4 gr. of sodium sulfite (the latter is utilized as a conducting salt). The current utilized may vary from 4 to 5 volts (density of current 0.15 to 0.2) and the temperature 50 to 60° C. By reducing the amount of potassium cyanide used in the bath the precipitation of gold may be proportionately decreased and by this means the desired carat can be controlled. It is preferred to used a platinum anode or some other anode which will not dissolve in the solution. After the material has received treatment in this bath all traces of the solution must be removed before subjecting it to the second bath.

(b) The second bath is prepared by dissolving 50 gr. of silver plating salts in 1 liter of water. The silver is the usual plating silver salts (Pantasol salts $KAg(CN)_2$, preferred which contain the silver in the form of silver cyanide with a small amount of conducting salts and 50 gr. of such Pantasol salts being equivalent to 20 gr. of pure silver). To this is added 12 gr. of potassium cadmium cyanide. The voltage should be about 1 volt (0.2 to 0.3 amperes) and the temperature about 20° C. The time of treatment from 20 to 25 minutes. The anode may be of pure silver or of a silver and cadmium alloy in the proportions of the metals contained in the precipitate. The precipitate will vary from 70 to 80% silver and 30 to 20% cadmium which it will be observed does not correspond to the proportions of the two metals in the bath.

(3) After the soldering material has been deposited on the material being treated it is washed in water treated according to steps 7 and 8 above as set forth under the example for making mesh fabrics from brass wire, covered with graphite (or a substitute therefor) and subjected to heat to melt the solder. After the solder has been melted the material is removed from the furnace and allowed to cool without disturbing it; the graphite knocked off and then washed.

(4) If it should be desirable to remove the solder deposited on the outside of the material (other than at the joints) this may be done by treating it in a suitable bath using the material as the anode whereby the solder from the outer surface of the ring is removed. Care must be taken not to remove the soldering material which forms the joint.

It is to be understood that the constant use of the baths will in time result in the exhaustion thereof and in some instances in a change of the proportions of metals necessary to obtain the best results, which changes in the constituency of the baths must be corrected periodically.

The foregoing examples are subject to wide variation, particularly with respect to the number of baths used and the materials used as soldering agents. Thus the bath used with brass alloy might be split up into more than one bath and likewise other soldering materials than those mentioned are utilizable, but the examples given will be found advantageous in carrying out this invention.

When this invention is carried out in connection with a fabric made of joined rings or links, after it has received a deposit of soldering material will be found to be covered with a very thin film of soldering material. It will also be found upon examining the ring ends after removal from the electrolyte that such portions of the opposing ring ends as are in physical contact do not receive a deposit of the soldering material, but nevertheless in pressing the ring ends together during the formation of the rings all portions of the oppositely located ends are not in close physical contact and consequently during the deposit of the soldering material, such portions thereof which do not touch are covered with a film of soldering material. The completed fabric will be found to consist of a large number of interlinked rings, having the ends of each link very close together and firmly united by the soldering material. The outside of the joint will be entirely covered with the fused soldering material, in fact the soldering material will extend or span from one end of the ring across the joint to the other end, completely covering it and making it exceedingly difficult to locate. In such instances where the solder utilized is more costly than the metal of which the wire is made (this being particularly true of brass wire) it will be found advantageous to commercialize the fabric with the fused solder coating remaining thereon. This solder coating inasmuch as it is fused to the surface of the metal of the wire has great wearing ability much more so than mere plating and forms a valuable product of this invention.

The metals constituting the soldering material, both in the cases in which the materials are deposited in a single bath as well as in the instances in which several baths are used, are alloyed by the heating operation forming a homogeneous joint composed of the different materials used in the electrolyte. The alloying of the materials is also obtained on the outer surface of the materials soldered together. It is also to be noted that the deposited material in addition to being alloyed by the application of heat is fused to the surface upon which it is deposited.

It is to be understood that the particular salts of metals used in the electrolyte may vary according to experience, and in fact the composition of the electrolyte varies with the particular kind of metals of which the wire is made. It, however, has been found that the electrolyte should contain a substantial portion of the salts of particular metal predominating in the wire in the case of precious metal. Thus in soldering silver wire the electrolyte should contain as one of its ingredients a substantial proportion of silver plating salts and likewise in soldering gold wire the electrolyte should contain a substantial proportion of gold salts. The particular salts used in the electrolyte must be worked out in each instance depending upon the particular composition of the wire to be soldered. It is also necessary to understand that the cleansing step must be varied according to the particular metals constituting the wire which is being treated.

I claim:

1. The process of soldering articles having connected links which consists in depositing, between the adjoining ends of the links, by electrolytic action, material capable of having a soldering effect with respect to the metal of which the links are made and subsequently softening the material to solder the link ends together.

2. The process of soldering articles having connected links which consists in depositing by electrolytic action, a soldering material between the adjoining ends of the links and subsequently melting the solder material to unite the ring ends.

3. The process of soldering articles having connected links which consists in preparing an electrolyte containing in solution a salt of a metal susceptible of utilization as a soldering agent, immersing the article in said solution, passing an electric current through said solution whereby metal contained therein is deposited between the link ends of said article, removing said article from said solution, subsequently subjecting the article to an agent capable of softening the metal deposited thereon, and then permitting the metal thus softened to set.

4. In the process of forming articles having connected links the steps which consist in preparing an electrolyte containing in solution a salt of a metal susceptible of utilization as a soldering agent, immersing the article in said solution, passing an electric current through said solution whereby metal contained therein is deposited between the link ends of said article, removing said article from said solution, subsequently subjecting the article to an agent capable of softening the metal deposited, and removing the deposit from the surface of the links.

5. The process of soldering, consisting in depositing, upon the article to be soldered a film of soldering material, and subsequently reducing the solder to its final set.

6. In the process of soldering adjoining surfaces, the steps which consist in shaping a wire blank to a predetermined form with the ends thereof together, depositing a material capable of having a soldering effect with respect to said blank ends by electrolytic action at said blank ends, and finally melting the solder.

7. In the process of soldering adjoining surfaces, the steps which consist in depositing, by electrolytic action, upon said surfaces, materials capable of soldering said surfaces together, and finally melting said materials to join said surfaces.

8. In the process of soldering, the steps which consist in submerging an article to be soldered in an electrolyte containing soldering materials, passing an electric current through said electrolyte whereby soldering materials are deposited on the article to be soldered, covering said article with a material capable of retarding the flow of solder from said article, and finally melting the solder.

9. In the process of soldering, the steps which consist in depositing soldering materials upon an article to be soldered, by electrolytic action, treating said solder with a fluxing agent, covering said article with a material capable of retarding the flow of solder from the article, and finally causing the solder to take its final set.

10. In the process of forming articles having connected links, the steps which consist in intermeshing a series of links with the link ends in contact, submerging said intermeshed links in an electrolyte, depositing a soldering material upon said links by electrolytic action, covering said links with a material capable of retarding the flow of the soldering material from link to link, melting the solder, and finally permitting the solder to set to join the link ends together.

11. In the process of forming articles having connected links, which links are comprised of brass wire, the steps which consist in interlinking a series of links with the ends thereof in contact, depositing a soldering material upon the link ends and upon the outer surfaces of the links by electrolytic action, covering said links with a material capable of retarding the flow of the soldering material from link to link, heating the links to cause the solder to melt and join the link ends together and to fuse the material upon the outer surface of the links to said surfaces, permitting the soldering material to set, and finally cleaning said material.

12. In the process of forming articles having connected links, which links are comprised of base wire, the steps which consist in interlinking a series of links with the ends thereof in contact, depositing a soldering material upon the link ends and upon the outer surfaces of the links by electrolytic action, covering said links with a material capable of retarding the flow of the soldering material from link to link, heating the links to cause the solder to melt and join the link ends together and to fuse the material upon the outer surface of the links to said surfaces, permitting the soldering material to set, and plating said links to cover the soldering material fused thereon.

13. In the process of forming articles having connected links, which links are comprised of base wire, the steps which consist in interlinking a series of links with the ends thereof in contact, depositing a soldering material upon the link ends and upon the outer surfaces of the links by electrolytic action, said soldering material containing a substantial proportion of silver salts, covering said links with a material capable of retarding the flow of the soldering material from link to link, heating the links to cause the solder to melt and join the link ends together and to fuse the material upon the outer surface of the links to said surfaces, permitting the soldering material to set, and finally cleaning said material.

14. The process of forming articles having connected links which links are comprised of base wire, the steps which consist in linking together a multiplicity of individual links, cleansing said links to remove all foreign substances therefrom, submerging said material in a substantially flat condition in an electrolyte containing silver salts, passing an electric current through said electrolyte whereby silver salts are deposited upon said links, covering said links with a material capable of retarding the flow of the deposited metal from link to link, heating said links and deposited metal to cause said deposited metal to melt and to be fused to the said base wire at the ring ends and upon the outer surfaces of said links, and finally covering said fused metal with a finishing covering.

15. In the process of forming articles having connected links, the steps which consist in intermeshing a multiplicity of links, with the link ends in contact, depositing a soldering material by electrolytic action at said link ends, melting the soldering material, permitting the soldering material to set and keeping the links still, with respect to each other, during the heating and setting steps.

16. In the process of soldering adjacent surfaces, the steps which consist in depositing a soldering material by electrolytical action on both surfaces to be soldered, heating the soldering material to cause it to be fused to the said surfaces and permitting the fused solder to set whereby the surfaces are joined together.

17. In the process of soldering surfaces together, the steps which consist in bringing the surfaces to be soldered into physical contact, subjecting the surfaces to be soldered to the action of an electrolyte containing a soldering element, subjecting the surfaces and solder to heat to melt the solder and allowing the solder to set.

18. The process of soldering articles having connected links which consists in interlinking said links, depositing, between the adjoining ends of the links by electrolytic action, a soldering material, containing cadmium salts and subsequently subjecting the soldering material to heat to melt the solder.

19. The process of soldering silver articles having connected links which consists in interlinking said links, depositing between the adjoining ends of the links, by electrolytic action a soldering material containing silver and cadmium salts and subsequently subjecting the soldering material to heat to melt the solder.

In testimony whereof I have hereunto set my hand.

EUGEN THOMA.